(12) United States Patent
Lin et al.

(10) Patent No.: US 6,797,140 B2
(45) Date of Patent: Sep. 28, 2004

(54) ELECTRODEIONIZATION METHOD

(75) Inventors: YuPo J. Lin, Naperville, IL (US); Jamie Hestekin, Morton Grove, IL (US); Michelle Arora, Woodridge, IL (US); Edward J. St. Martin, Libertyville, IL (US)

(73) Assignee: The University of Chicago, Chicago, IL (US)

( * ) Notice: Subject to any disclaimer, the term of this patent is extended or adjusted under 35 U.S.C. 154(b) by 69 days.

(21) Appl. No.: 10/213,721

(22) Filed: Aug. 6, 2002

(65) Prior Publication Data

US 2004/0060875 A1 Apr. 1, 2004

(51) Int. Cl.[7] .............................................. B01D 61/48
(52) U.S. Cl. ....................... 204/524; 204/530; 204/533
(58) Field of Search ................................ 204/524, 530, 204/533

(56) References Cited

U.S. PATENT DOCUMENTS

| 4,882,277 A | 11/1989 | Czytko et al. |
| 5,919,831 A | 7/1999 | Philipp |
| 6,071,397 A * | 6/2000 | Terada et al. ............... 204/632 |
| 6,207,039 B1 * | 3/2001 | Moulton et al. ............ 205/703 |
| 6,241,866 B1 | 6/2001 | Mir |
| 6,284,124 B1 | 9/2001 | DiMascio et al. |
| 6,312,577 B1 | 11/2001 | Ganzi et al. |
| 6,344,122 B1 | 2/2002 | Deguchi et al. |
| 6,365,023 B1 * | 4/2002 | De Los Reyes et al. .... 204/524 |

FOREIGN PATENT DOCUMENTS

WO    wo20010012292    * 2/2001

* cited by examiner

Primary Examiner—Arun S. Phasge
(74) Attorney, Agent, or Firm—Emrich & Dithmar LLC

(57) ABSTRACT

An electrodeionization method for continuously producing and or separating and/or concentrating ionizable organics present in dilute concentrations in an ionic solution while controlling the pH to within one to one-half pH unit method for continuously producing and or separating and/or concentrating ionizable organics present in dilute concentrations in an ionic solution while controlling the pH to within one to one-half pH unit.

31 Claims, 6 Drawing Sheets

ELECTRODEIONIZATION METHOD

CONTRACTUAL ORIGIN OF THE INVENTION

The United States Government has rights in this invention under Contract No. W-31-109-ENG-38 between the U.S. Department of Energy and the University of Chicago representing Argonne National Laboratory.

BACKGROUND OF THE INVENTION

The present invention relates to electrodeionization (EDI) and more particularly, a method for treating fluids via electrodeionization.

Electrodeionization (EDI), also known as electrochemical ion-exchange, is an advanced ion-exchange technology that combines the advantages of ion-exchange and electrodialysis. In electrodeionization processes, ion-exchange resins are sequestered in dilute feed compartments to increase the ionic conductivity, so that even with a very dilute ionic feed ($10^{-1}$ N), a stable operation with higher flux and lower energy consumption than electrodialysis, becomes possible. The electric power also splits the water molecule ($H_2O$) in to H+ and OH– ions and the resins are thus regenerated while the ions are removed.

EDI technology presently is used to make deionized water for boiler feed and high purity industrial water applications. There are also many other potential uses of such technology for organic process streams in a variety of industries. One problem encountered in the production of organics such as organic acids and amines is pH control. For example, efficient biocatalytic production of acids and amines is often limited to a narrow pH range for optimal productivity. The present invention provides very accurate pH control using EDI technology, which in combination with previous work at Argonne National Laboratory (ANL) relating to EDI cell design, results in superior production, separation and concentration of a wide variety of organics.

Ion exchange beads that are commonly used for EDI applications may contain strongly acidic resins containing for instance sulfonic acid groups, or strongly basic resins containing for instance quaternary ammonium groups. Other resins such as those with weakly acidic resins for instance carboxylic acid groups or weakly basic resins for instance amines groups are also used when required, and according to the invention may be mixed as required. These resin beads are cross-linked with polymers usually styrene divinyl benzene or acrylates. The resins can be gel type or macroreticular type. Usually equivalent mixtures of cationic and anionic resins have been used in the EDI compartments. For specialized applications one type of resin or adsorbent beads mixed with ion-exchange resins may be used. A device useful in the practice of the present invention is disclosed in PCT Application WO 01/12292, the entire disclosure of which is incorporated by reference. Another publication disclosing resins applicable to EDI processes is the Terada et al. U.S. Pat. No. 6,071,397 issued Jun. 6, 2000, the entire disclosure of which is also incorporated by reference.

SUMMARY OF THE INVENTION

It is an object of the present invention to provide a method of controlling the pH or capturing ionic organics in an EDI process.

Another object of the present invention is to provide a method of transferring ionizable organics while controlling the pH in an EDI process and device.

Yet another object of the invention is to provide an economical method for continually producing organic acids and/or amines while controlling the pH to within one pH unit.

Briefly, the invention utilizes the previously mentioned ANL developments including ion-exchange resins having cation-exchange moieties and anion-exchange moieties immobilized relative to each other conferring ion-conductivity and liquid permeability to the material in an EDI stack continuously to produce, separate and concentrate dilute organics while controlling the pH thereof.

The invention also provides a method of controlling the pH of a fluid during electrodionization by adjusting one or more of the resin content in the wafers, adjusting the ratio of strong or weak acid resins to strong or weak base resins in the wafers, the concentration and amount of ionizable organic material flowing through the EDI stack and the current applied to the EDI stack while regenerating the resin, in situ.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

DETAILED DESCRIPTION OF THE INVENTION

Figure 1:
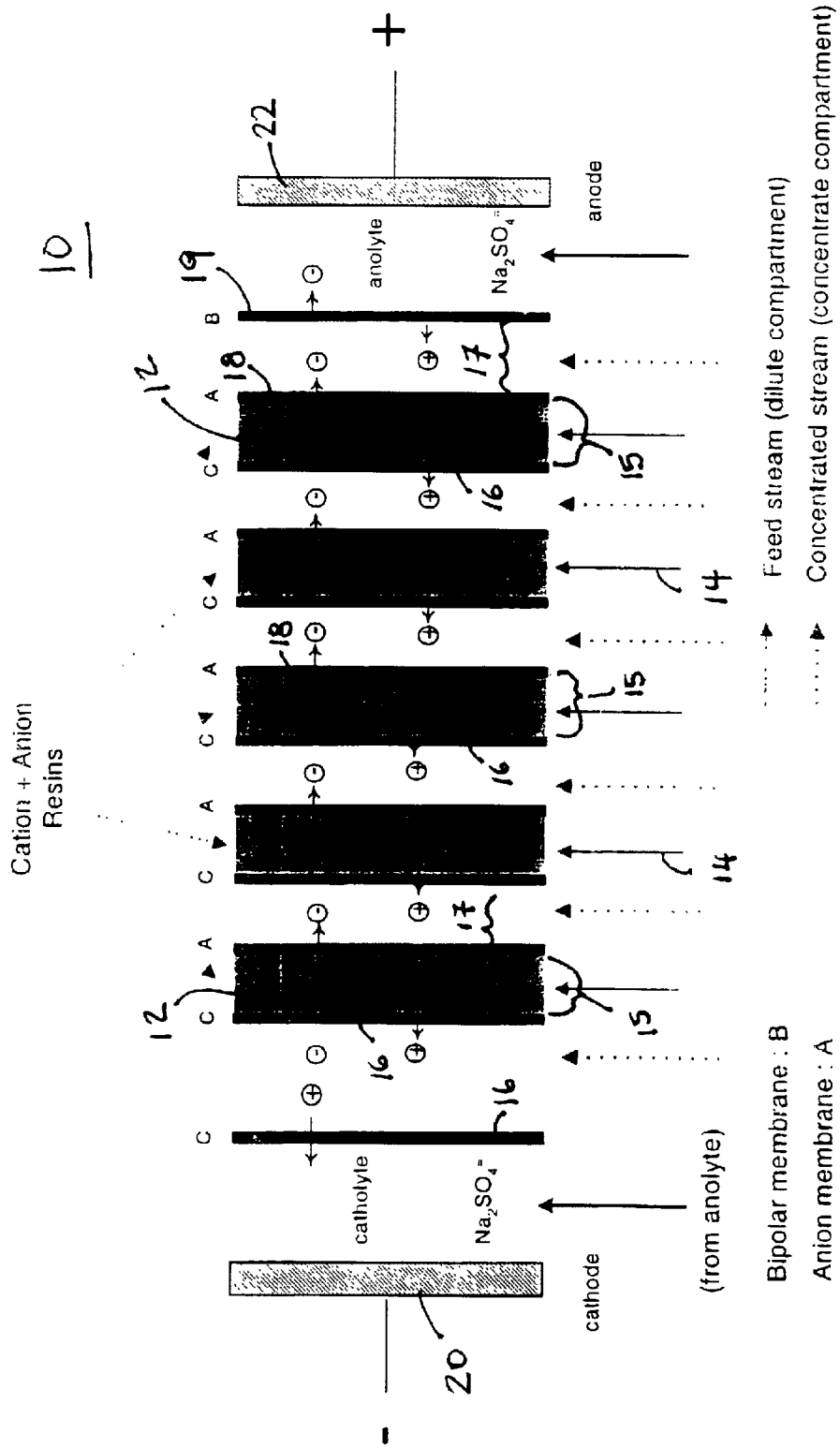
FIG. 1 is a schematic representation of an EDI process illustrating the present invention.

A general overview of a suitable electrodionization device 10 is illustrated as numeral 10 in FIG. 1. An important feature of the device 10 is the porous, immobilized ion-exchange material 12 which facilitates rapid deployment of ionic constituents out of a diluate feed 14.

The wafer material, discussed in the previously mentioned and incorporated PCT application WO 01/12292, is positioned intermediate, a cation exchange membrane 16 and an anion exchange membrane 18, the entire triad therefore comprising a reaction chamber 15. A bipolar membrane 19 may be positioned intermediate the terminal anion membrane 18 and the anode 22. A means for facilitating ion transport through the EDI stack is employed. For example, an electrical potential imparted via opposing electrodes 20, 22 (cathode and anode, respectively) provides the gradient to facilitate ion transfer out of the diluate feed 14, and into the respective product chambers 17, each defined by adjacent cation membrane 16 and anion membrane 18.

The porous immobilized ion-exchange material previously described in PCT application WO/01/12292 may be formed into wafers 12 having relatively uniform thicknesses of between approximately 2 and 6 millimeters. The wafers 12 are suitably porous with between 20 percent and 60 percent porosity so that a liquid will flow through with minimal resistance and the resin beads should be uniformly dispersed in close proximity to each other. "Porosity" is construed herein as the macroscopic void space that can be filled by a liquid.

Referring to FIG. 1, typically the diluate stream or feed 14 consisting of an ionizable fluid such as an ionizable organic wherein the organic may be present in extremely dilute solutions such as $10^{-3}$ normal. The diluate feed 14 enters into the EDI device 10 and migrates upwardly (it permeates upwardly), as is well known in the art, contacting the various ion-exchange resins in the wafers 12. At the same time, the feed stream 14 is subjected to the effect of an anion exchange membrane 18 and a cation exchange membrane 16 under the potential applied across the device 10. As illustrated in FIG. 1, the cations migrate through the cation exchange membranes 16 and anions migrate through the anion exchange membranes 18 transferring at least some of the ionizable organic from the ion conducting fluid inside the reaction chambers 15 into the product chambers 17. Simultaneously, ion exchange resins in the wafers 12 become depleted; however, under the influence of the potential across the anode 22 and cathode 20, the ionizable fluid splits into a proton and a negative ion, while the proton regenerates the ion exchange resins in the wafers 12 the negative ions from the ionizable fluid reacts with the protons produced as the ionizable organic disassociates. It is the association of the positive portion of the ionizable organic and the negative portion of the split ion conducting fluid which controls the pH of the material within the reaction chamber 15. A crucial aspect of the present invention is pH control.

An important feature of the present invention is the ability to produce continuously various organic acids or organic amines or other ionizable organics while maintaining close pH control notwithstanding that production of certain organic materials causes the pH either to rise automatically or to lower automatically. It is the maintenance of the pH control within one or within one-half pH unit that allows the continuous production of the organics.

When ions pass from the reaction chambers 15 into the product chambers 17, the ions reassociate to form a concentrated product stream. The product stream is concentrated with respect to the concentration of the product in the diluate feed 14. Accordingly, the present invention may be used to concentrate ionic materials present in an ion conducting fluid. Moreover, the pH control in the reaction chambers 15 may be maintained either in acidic ranges or in basic ranges. For instance, the pH control by the present invention has been maintained in the range of from 3 to 7, 3 to 5, and 5 to 7. More particularly, within the above-stated ranges, the pH has been controlled within one-half pH unit in any one of the aforementioned ranges. Further, the pH may be controlled in the reaction chambers 15 from 7 to 11 and more particularly, from 8 to 10 and within one or one-half pH unit. An ionizable organic acid and/or organic amine may be produced continuously from an ion conducting aqueous fluid having a substance, as previously described, which is capable of producing the ionizable organic acid and/or ionizable organic amine. The variables which control the pH within the reaction chambers 15 include the electrical potential applied across the stack cathode 20 and anode 22, adjustment of the resin content in the wafers 12, adjustment of the ratio and types of the ion exchange resins in the wafers 12, the amount of the substance producing the ionizable organic acids and/or organic amines in the ionizable fluid flowing through the EDI device, the flow rate of the diluate feed 14, and various combinations of these variables.

As is known in the art, the ion exchange resins applicable to the present invention and most particularly to the wafers 12 may be selected from strong acid resins, weak acid resins, strong base resins and weak base resins, all as previously described.

Figure 2:
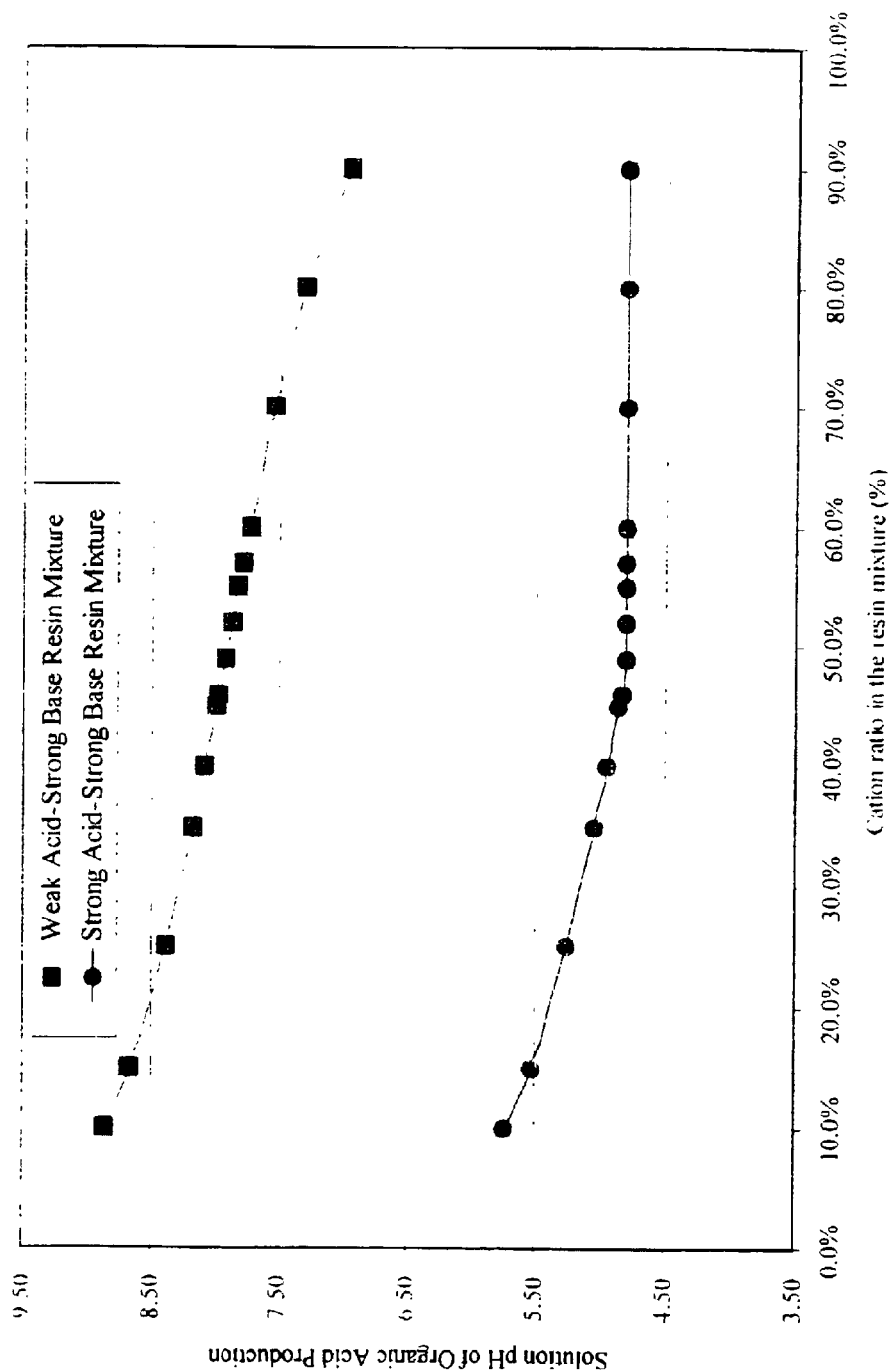
FIG. 2 is a graphical representation showing the relationship between the solution pH of an organic acid and the cation ratio in the resin mixture.
Figure 3:
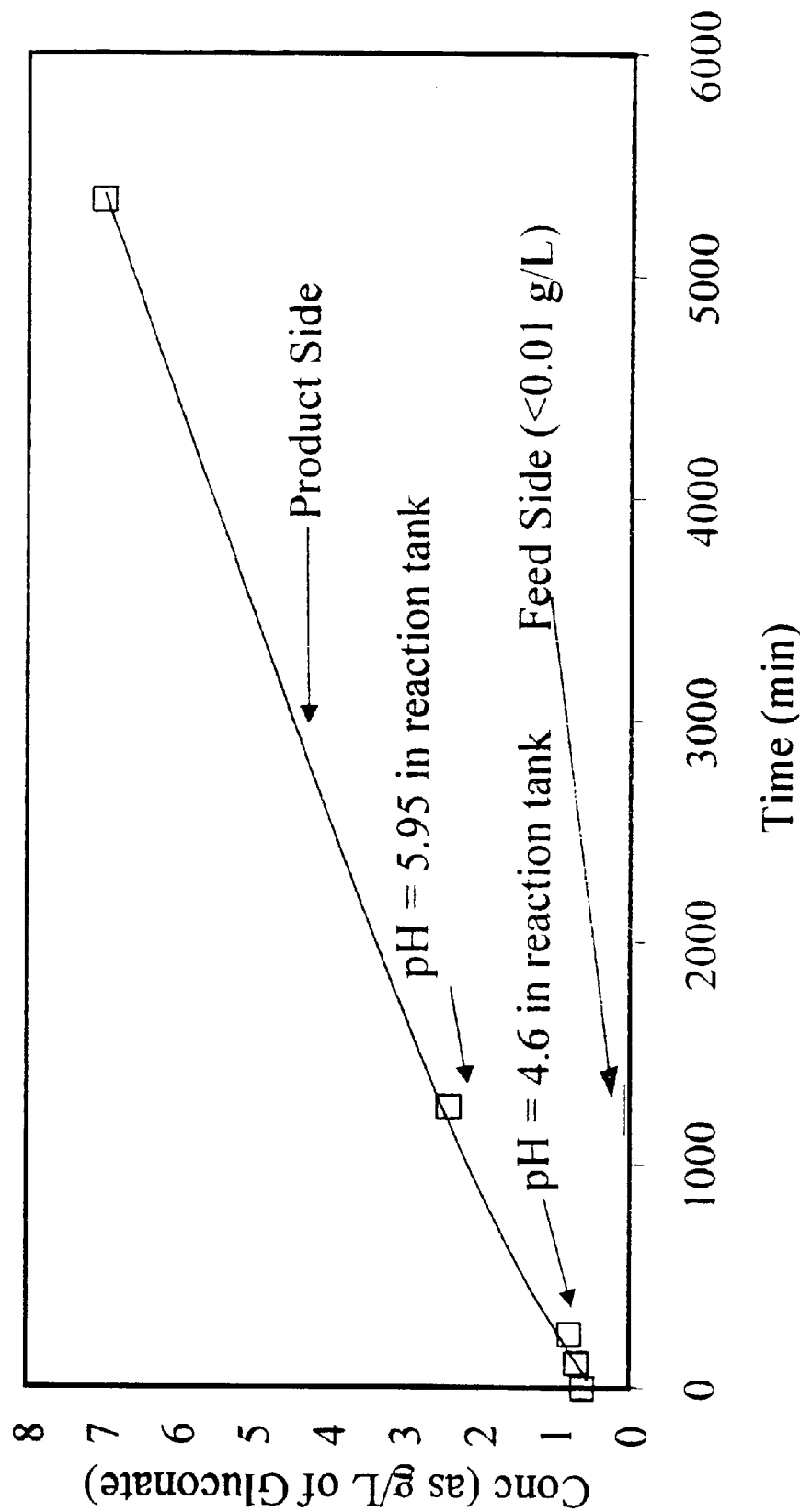
FIG. 3 is a graphical representation of the relationship between the concentration of gluconate and the time of the enzymatic reaction producing gluconic acid.

Referring now to FIG. 2 of the present invention there is shown the relationship between the variation in the cation ratio in the resin mixture and the pH for a weak acid-strong base resin mixture and for a strong acid-strong base resin mixture. The figure and the data on which it is based show that the pH is affected by the content of the resins in the wafers 12. FIG. 3 shows the enzymatic reaction and separation of a gluconic acid in the EDI device 10 of the present invention. In the data illustrated in FIG. 3, it is seen that the enzymatic reaction producing gluconic acid extended over a long period of time (about 80 hours), the pH in the reaction tank was consistently held above 4.6, notwithstanding the continuous production of gluconic acid. In fact, the pH actually rose in the reaction tank during the time the data was collected in FIG. 3. Specifically, a five-cell-pair EDI stack 10 as illustrated in FIG. 1 was assembled. Mixed cation-anion resin wafers 12 were used in the stack 10. The resins in the wafers 12 were strong acid cation resins and strong base anion resins with a cation to anion capacity ratio of 1:105. The product of either the enzyme reaction or the fermentation was fed into the reaction compartments 15 and the organic acid produced from the reactions therein was transported into the product compartments 17 by means of the applied current.

Glucose oxidase (GOD), which converts glucose into gluconic acid was selected for an experiment to control the pH in an enzymatic reaction. GOD is sensitive to the pH of the solution and loses most of its activity when the pH drops below 4.0. In the experiment illustrated in FIG. 3, 4 liters of 40 gram/L D-glucose was reacted with 30.5 milligrams of GOD. The solution was pumped into the EDI stack 10 and recirculated at a flow rate of 300 milliliters per minute. Current was applied to the EDI stack 10, more particularly, across the cathode 20 and anode 22 to remove protons and gluconate ions produced by the enzymatic reaction from compartment 15 to the product compartment 17. FIG. 3 shows the results of the gluconic acid production obtained from the product compartment 17. The pH of the reaction tank was maintained above 4.6 by the inventive EDI process. The reaction was continuously operated for more than 80 hours with reactivity about 0.08 milligrams/milligrams of GOD per minute. Nearly 7 grams per liter of gluconic acid was produced and the separation of the gluconic acid from the reactant approached 100%.

Figure 4:
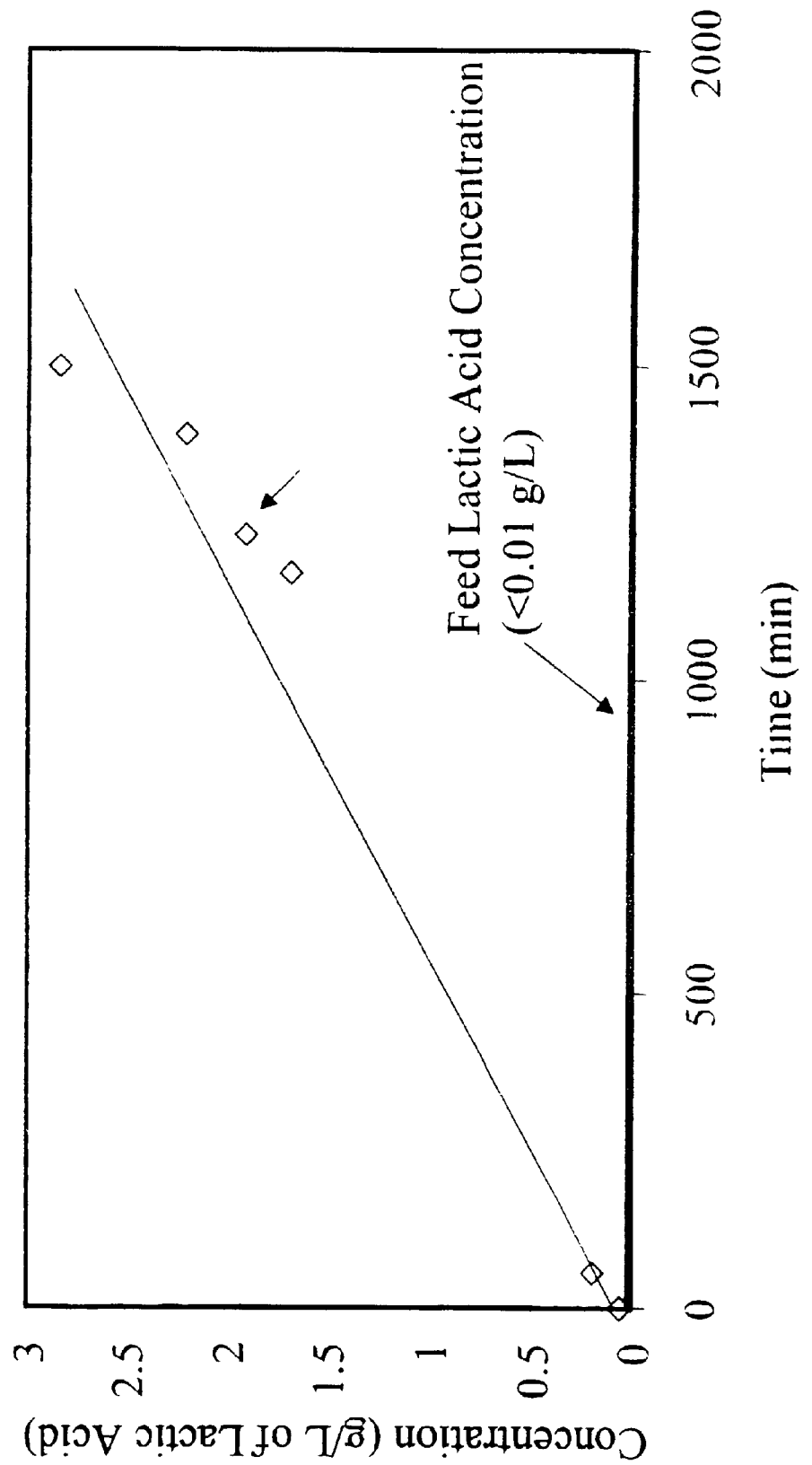
FIG. 4 is a graphical representation of the relationship between the concentration of lactic acid and the time of fermentation producing lactic acid with the pH controlled by the process of the subject invention.
Figure 5:
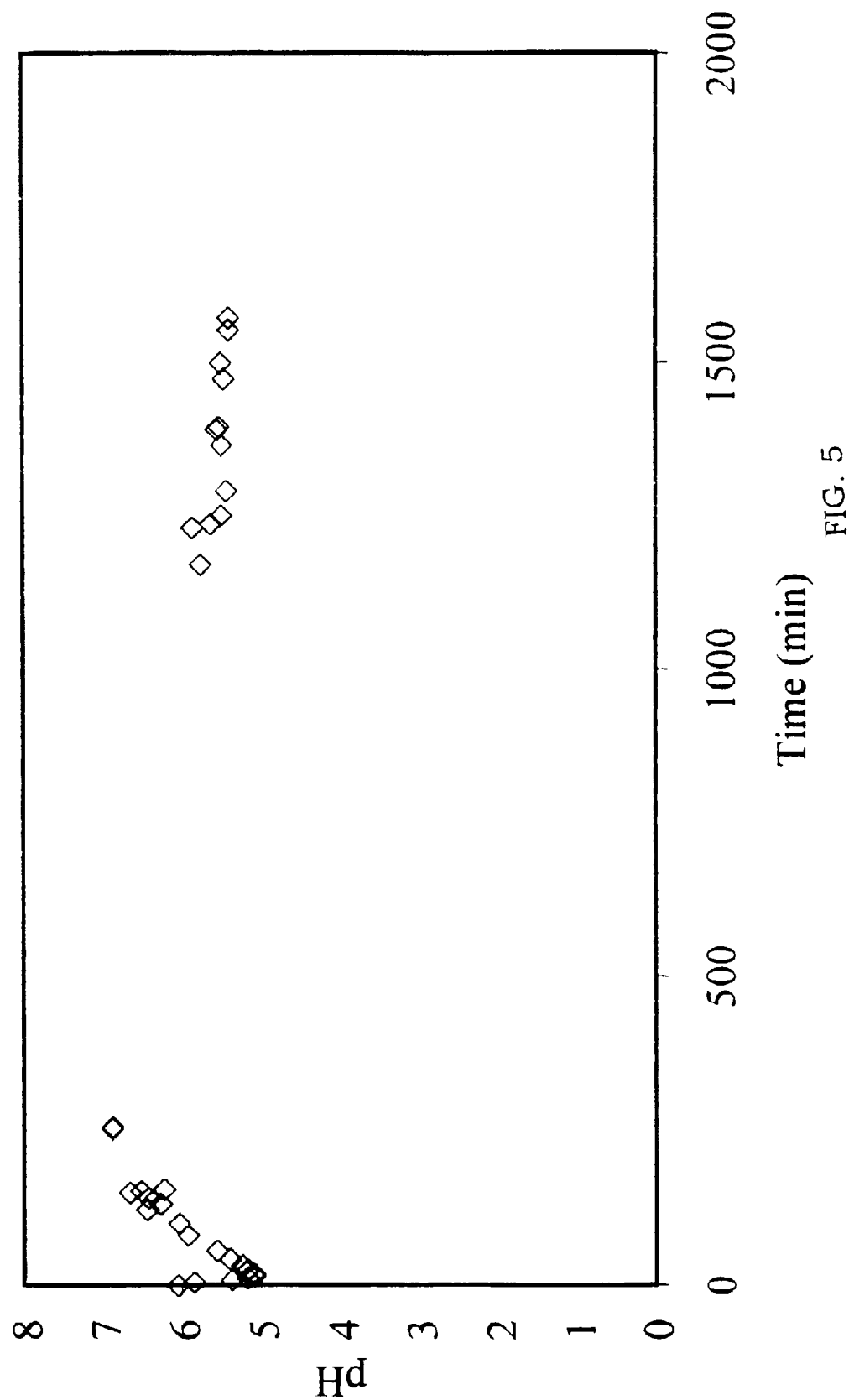
FIG. 5 is a graphical representation of the relationship between the pH in a fermentation reactor as a function of time in a controlled EDI reactor using the method of the subject invention.

A specialized microorganism that could convert the glucose into lactic acid was used in a fermentation tank in conjunction with the EDI stack 10. 1.0 liters of 1 gram per liter D-glucose reactant with 1.0 gram dry weight whole cells (2.6 gram wet weight whole cells) was circulated between a fermentation tank and the EDI stack 10 at a flow rate of 200 milliliters per minute. Neither growth medium nor nutrients was used or added during the fermentation. FIG. 4 shows the transport of the lactic acid produced from the fermentation in the product compartment 17. 3.0 grams per liter of lactic acid was produced at a reactivity of about 0.3 grams per liter per hour. The separation of lactic acid was nearly 100%. FIG. 5 shows the pH profile of the fermentation tank during the experiment. As noted, the pH of the fermentation was maintained between 5.8 and 7.0 notwithstanding the continuous production of lactic acid.

Figure 6:
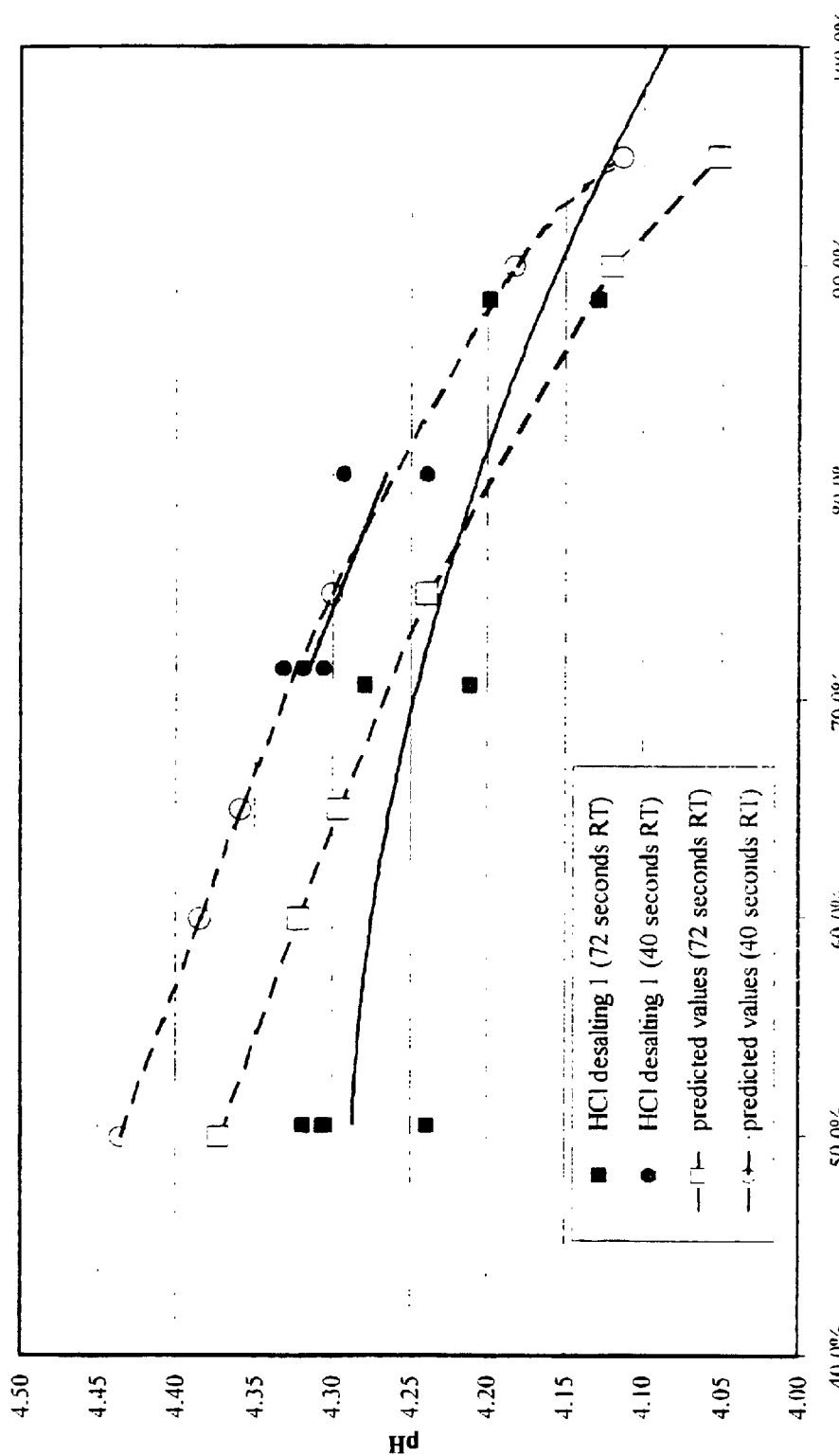
FIG. 6 is a graphical representation of the relationship between pH and current utilization in an EDI process incorporating the present invention.

An example of fine tuning the pH control using the EDI stack is illustrated in FIG. 6. The pH of the solution was manipulated by the applied current and feed flow rate and the concentration of the solution fed into the EDI stack 10. 0.001 normal hydrochloric acid solution was fed into the EDI stack with a 50% cation resin ratio in the resin wafers 12. The EDI stack was operated at two different residence times (RT) for the ion-exchange process, for 40 seconds and 72 seconds. Referring to FIG. 6, it is shown that the general trend of the solution pH could be precisely controlled by adjusting the applied current (i.e., the current utilization).

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. A method of transferring an ionizable organic from an ion conducting fluid containing the ionizable organic from one place to another while controlling the pH thereof comprising establishing a source of ion conducting fluid containing the ionizable organic, introducing the ion conducting fluid containing the ionizable organic into an electrodeionization (EDI) stack having an anode and a cathode resin wafer interleaved between a cation exchange membrane and an anion exchange membrane, providing a mechanism for supplying an electric potential between the EDI stack anode and cathode, whereby when the electric potential is applied to the EDI stack anode and cathode and the ion conducting fluid containing the ionizable organic passes through the resin wafers in the reaction chambers at least some of the ionizable organic present in the ion conducting fluid disassociates into a cation passing through the cation-exchange membrane and an anion passing through the anion-exchange membrane, transferring at least some of the ionizable organic from the ion conducting fluid inside the reaction chambers to outside the reaction chambers through a porous solid ion exchange resin wafer to control the pH of the ion conducting fluid remaining in the reaction chambers by interaction with the wafer.

2. The method of claim 1, wherein the ion conducting fluid is aqueous.

3. The method of claim 1, wherein the ion conducting fluid is water.

4. The method of claim 1, wherein the ion conducting fluid includes an organic acid and/or organic amine producing substance.

5. The method of claim 4, wherein the organic acid and/or organic amine producing substance includes an enzyme.

6. The method of claim 4, wherein the organic acid and/or organic amine producing substance includes bacteria.

7. The method of claim 4, wherein the organic acid and/or organic amine producing substance includes an organism.

8. The method of claim 4, wherein the organic acid and/or organic amine producing substance is in contact with or associated with the ion exchange resin wafers.

9. The method of claim 4, wherein the organic acid and/or organic amine is produced continuously.

10. The method of claim 4, wherein the organic acid is a carboxylic acid.

11. The method of claim 10, wherein the carboxylic acid includes one or more of a mono-, di-, and tricarboxylic acid group.

12. The method of claim 4, wherein the organic amine includes one or more of a mono, di-, and triamine group.

13. The method of claim 4, wherein the organic acid is an amino acid.

14. The method of claim 1, wherein the cations and anions of organic acid and/or organic amine re-associate after passing through the reaction chambers to form a product stream.

15. The method of claim 14, wherein the re-associated cations and anions of organic acid and/or organic amine are concentrated in the product stream with respect to the concentration of the organic acid and/or organic amine in the ion conducting fluid in the reaction chambers.

16. The method of claim 1, wherein the pH in the reaction chamber is maintained in the range of from 3 to about 7.

17. The method of claim 1, wherein the pH in the reaction chamber is maintained in the range of from about 5 to 7.

18. The method of claim 1, wherein the pH in the reaction chamber is maintained in the range of from about 3 to about 5.

19. The method of claim 1, wherein the pH in the reaction chamber is maintained within the range of from 7 to 11.

20. The method of claim 1, wherein the pH in the reaction chamber is maintained within the range of from 8 to 10.

21. The method of claim 1, wherein the pH in the reaction chamber is maintained within ½pH unit of a prescribed pH value.

22. A method of continuously producing an ionizable organic acid and/or organic amine from an ion conducting aqueous fluid containing a substance producing an organic acid and/or organic amine while controlling the pH comprising establishing a source of ion conducting aqueous fluid containing organic acid and/or organic amine producing substance, introducing the ion conducting aqueous fluid containing organic acid and/or organic amine producing substance into an electrodeionization (EDI) stack having an anode and a cathode and a plurality of reaction chambers each formed from a porous solid ion exchange resin wafer interleaved between a cation exchange membrane and an anion exchange membrane and a plurality of product chambers in communication with the reaction chambers, providing a mechanism for supplying an electric potential between the EDI stack anode and cathode, whereby when the electric potential is applied to the EDI stack anode and cathode and the ion conducting aqueous fluid containing organic acid and/or organic amine passes through the resin wafers in the reaction chambers at least some of the organic acid and/or organic amine present in the ion conducting aqueous fluid disassociates into a cation passing through the cation-exchange membrane into a product chamber and an anion passing through the anion-exchange membrane into a product chamber depleting the ion exchange resin while water is split into a positive ion and a negative ion throughout the wafers, the ionic transporting rates of the disassociation of at least some of the organic acid and/or organic amine from the ion conducting fluid inside the reaction chambers and the positive and negative ions from the water splitting reaction controlling the pH of the ion conducting aqueous fluid in the reaction chambers permitting the organic acid and/or organic amine producing substance continuously to produce organic acid and/or organic amine while the positive and negative ions from the water splitting regenerate the depleted ion exchange resins in the wafers.

23. The method of claim 22, wherein a plurality of organic acids and/or amines are produced simultaneously.

24. The method of claim 23, wherein a non-ion conducting fluid is introduced into the EDI stack with the ion conducting aqueous fluid.

25. The method of claim 22, wherein the pH in the reaction chambers is maintained within one pH unit of a prescribed pH valve.

26. The method of claim 22, wherein the pH in the reaction chambers is maintained within ½ pH unit of a prescribed pH valve.

27. A method of continuously producing, separating, and concentrating a dilute ionizable organic from an ion conducting aqueous fluid containing a substance producing the ionizable organic while controlling the pH comprising establishing a source of ion conducting aqueous fluid containing the ionizable organic producing substance, introducing the ion conducting aqueous fluid containing the ionizable organic producing substance at a variable flow rate into an electrodeionization (EDI) stack having an anode and a cathode and a plurality of reaction chambers each formed from a porous solid ion exchange resin wafer interleaved between a cation exchange membrane and an anion exchange membrane and a plurality of product chambers in communication with the reaction chambers, providing a mechanism for supplying and varying an electric potential between the EDI stack anode and cathode, the porous solid ion exchange resin wafer containing one or more of a strong acid resin, a weak acid resin, a strong base resin, a weak base resin or mixtures thereof, whereby when an electric potential is applied to the EDI stack anode and cathode and the ion conducting aqueous fluid containing the produced organic passes through the resin wafers in the reaction chambers at least some of the ionizable organic present in the ion conducting aqueous fluid disassociates into a cation passing through the cation-exchange membrane into a product chamber and an anion passing through the anion-exchange membrane into a product chamber thereby depleting the ion exchange resin in the solid porous wafers while water is split into a positive ion and a negative ion, the ionic rates of the disassociation of at least some of the ionizable organic from the ion conducting aqueous fluid inside the reaction chambers and the positive and negative ions from the water splitting reaction controlling the pH of the ion conducting aqueous fluid in the reaction chambers permitting the ionizable organic producing substance continuously to produce the ionizable organic while the positive and negative ions from the water splitting regenerate the depleted solid porous ion exchange resin wafers, the pH of the aqueous ion conducting fluid in the reaction chambers being controlled to within about one pH unit of preselected pH by adjusting the resin content in the porous solid ion exchange resin wafer, the ratio of different ion exchange resins in the porous solid resin wafers, the amount of substance producing the ionizable organic, the flow rate of the ion conducting aqueous fluid through the reaction chambers, the current applied to the EDI stack and combinations thereof, the dilute ionizable organic continuously being produced in the reaction chambers and being continuously transferred therefrom to the product chambers where the ions re-associate thereby purifying and separating and concentrating the ionizable organic.

28. The method of claim 27, wherein the dilute ionizable organic in the ion conducting aqueous fluid may have a concentration of not greater than about $10^{-1}$ N.

29. The method of claim 27, wherein the pH is controlled to within about ½ pH unit greater than 7.

30. The method of claim 27, wherein the pH is controlled to within about ½pH unit less than 7.

31. A method of transferring an organic acid and/or an organic amine from one place to another while controlling the pH thereof while comprising establishing a source of ion conducting fluid containing an enzyme and/or bacteria and/or an organism which produces the organic acid and/or organic amine, introducing the ion conducting fluid containing the ionizable organic into an electrodeionization (EDI) stack having an anode and a cathode resin wafer interleaved between a cation exchange membrane and an anion exchange membrane, providing a mechanism for supplying an electric potential between the EDI stack anode and cathode, whereby when the electric potential is applied to the EDI stack anode and cathode and the ion conducting fluid containing the ionizable organic passes through the resin wafers in the reaction chambers at least some of the ionizable organic present in the ion conducting fluid disassociates into a cation passing through the cation-exchange membrane and an anion passing through the anion-exchange membrane, transferring at least some of the ionizable organic from the ion conducting fluid inside the reaction chambers to outside the reaction chambers through a porous solid ion exchange resin wafer to control the pH of the ion conducting fluid remaining in the reaction chambers by interaction with the wafer.

* * * * *